(No Model.) 3 Sheets—Sheet 1.

J. JENKINS.
MACHINE FOR MAKING SAFETY PINS.

No. 349,226. Patented Sept. 14, 1886.

Attest:
John A. Ellis
A. B. Moore

Inventor:
Joel Jenkins
By David A. Burr
Atty.

(No Model.) 3 Sheets—Sheet 2.
J. JENKINS.
MACHINE FOR MAKING SAFETY PINS.
No. 349,226. Patented Sept. 14, 1886.
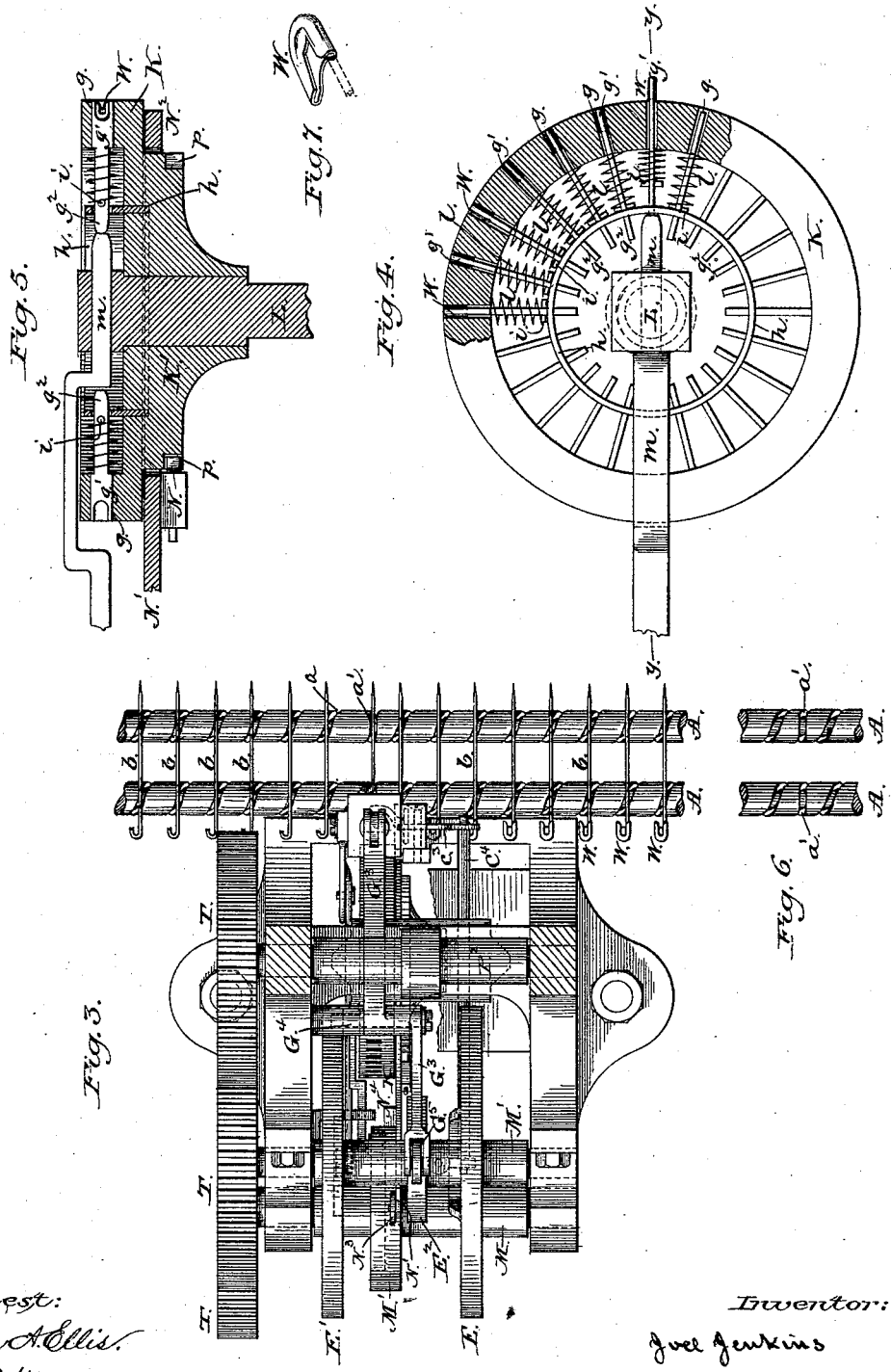

(No Model.) 3 Sheets—Sheet 3.

J. JENKINS.
MACHINE FOR MAKING SAFETY PINS.

No. 349,226. Patented Sept. 14, 1886.

Attest:
John A. Ellis
A. B. Moore

Inventor:
Joel Jenkins
By Daniel A. Burr
Atty.

United States Patent Office.

JOEL JENKINS, OF MONTCLAIR, NEW JERSEY.

MACHINE FOR MAKING SAFETY-PINS.

SPECIFICATION forming part of Letters Patent No. 349,226, dated September 14, 1886.

Application filed November 27, 1885. Renewed July 27, 1886. Serial No. 209,240. (No model.)

*To all whom it may concern:*

Be it known that I, JOEL JENKINS, of Montclair, in the county of Essex and State of New Jersey, have invented a new and useful Improvement in Machines for the Manufacture of Safety-Pins; and I do hereby declare that the following is a full and exact description thereof, reference being had to the accompanying drawings, and to the letters of reference marked thereon, making a part of this specification.

My invention relates to machines for the manufacture of safety-pins, and has for its object to form and fasten the cap automatically upon the end of the wire forming the pin, the wire having previously been bent to receive said cap.

Figure 2:
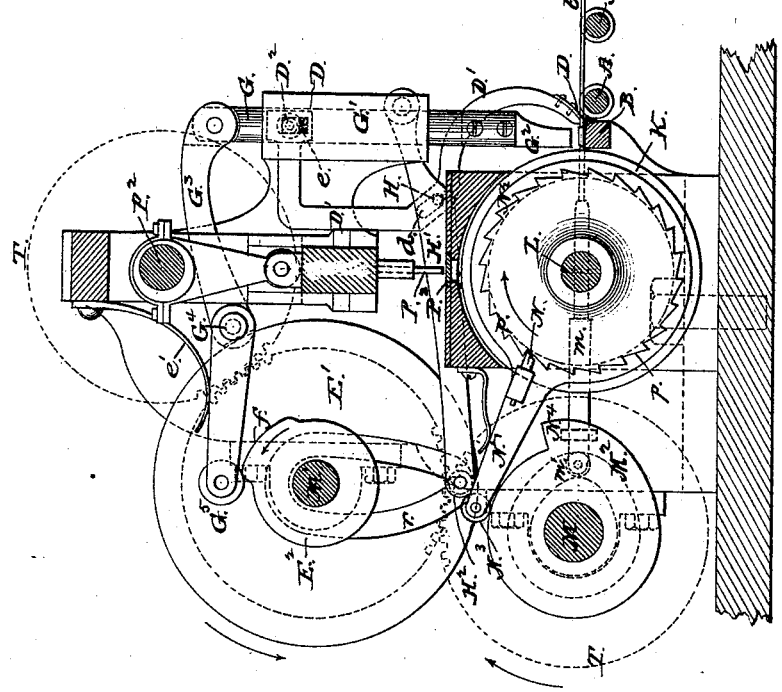
Figure 1:
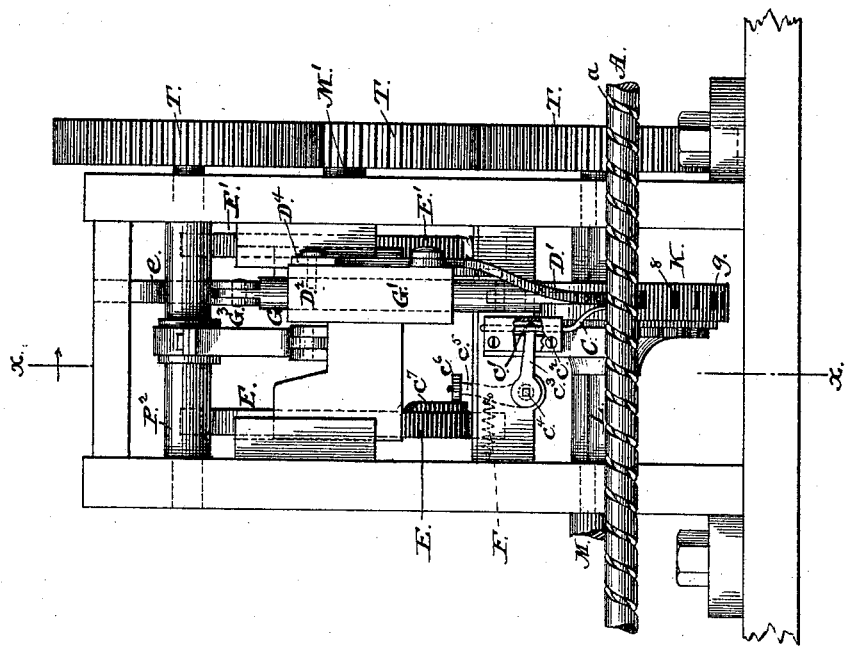
Figure 8:
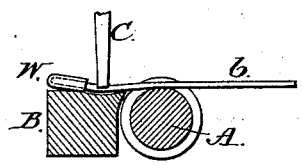
Figure 9:
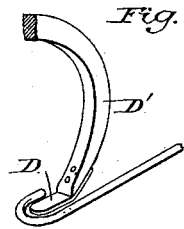
Figure 10:
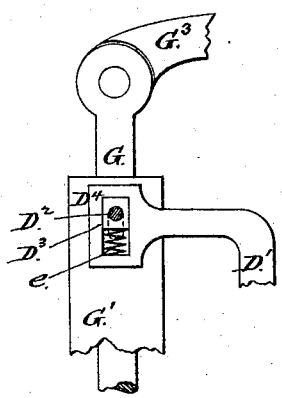
Figure 11:
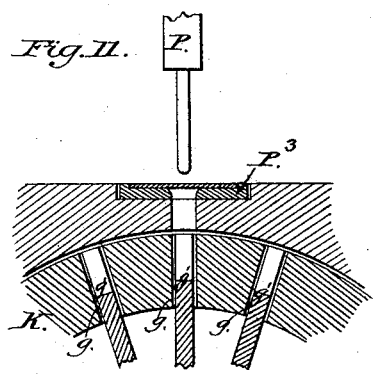
Figure 14:
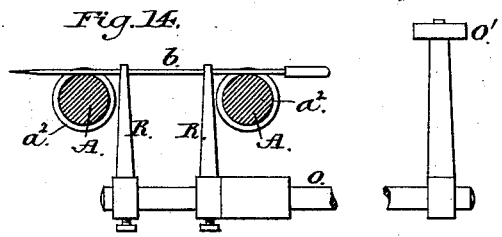
Figure 12:
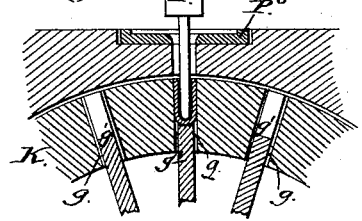
Figure 13:
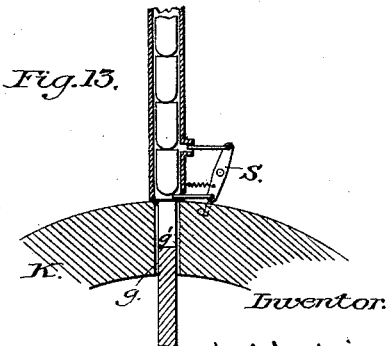

In the accompanying drawings, Figure 1 is a front view of the machine which I have invented to accomplish this object; Fig. 2, a section in line $x\ x$ of Fig. 1; Fig. 3, a top view of the machine; Fig. 4, an enlarged side view of the cap feeding wheel; Fig. 5, a central section in line $y\ y$ of Fig. 4; Fig. 6, a detached plan of that portion of the conveying-shafts in which the grooves are cut transversely; Fig. 7, a detached view, in perspective, of one of the caps to be affixed to the pin-blank; Fig. 8, an enlarged detached sectional view of the retaining-finger in position on the wire blank; Fig. 9, an enlarged detached view, in perspective, of the mandrel in position to re-enforce and support the bend in the wire blank; Fig. 10, an enlarged elevation of the upper end of the bar carrying the mandrel, illustrating its pivotal connection to the punch-bar; Figs. 11 and 12, enlarged sectional views illustrating the operation of the punch forming the cap, and which forces it into the radial cap-carrying plate of the feed-wheel. Fig. 13 illustrates a modification in the mode of delivering the caps to the wheel; Fig. 14, a transverse section illustrating in detail the device for lifting the wire blanks from the transverse grooves in the conveying-shafts when said grooves are made to completely encircle the shafts, Fig. 15 being a plan view thereof.

A A represent the two parallel spirally-grooved rotating conveying-shafts common to pin-making machines of this class, and whose function it is to carry the blanks or bits of wire to form the pins forward through the machine. These shafts are geared to rotate in unison, but their bearings and gear-wheels are not shown in the drawings. The spiral grooves $a\ a$ thereon are wide enough to permit the blanks or bits of wire to lie therein at a right angle to the length of the shafts.

To arrest the movement of the wire blanks momentarily at any given point without arresting the continuous rotation of the shafts, I carry the grooves, which are elsewhere spiral, each at said point at a right angle to the length of the shaft, as shown at $a'$, Figs. 3 and 6. If the speed of rotation of the shaft is so great as that sufficient time will not be allowed for the required movements of the mechanism to accomplish the desired result upon the end of the wire blank within the time required for one rotation of the shaft, I carry this transverse portion of the groove entirely around the shaft, as shown at $a^2\ a^2$, in Figs. 13 and 14, so that the blank shall remain therein stationary until lifted out by auxiliary devices, as will be hereinafter more fully explained. Otherwise the transverse groove $a'$, diverging from the spiral direction at one end, passes again into a spiral at the other before it has fully encircled the shaft, as shown in Figs. 3 and 6, so that the wire blank $b$, momentarily arrested in said transverse groove $a'$ upon each shaft, shall be made to move forward therefrom before the shafts have made a complete revolution. The wire pin-blanks $b\ b$ are pointed in the usual manner, and are bent at one end, as shown in Fig. 3 of the drawings, before reaching my improved mechanism for capping them.

The devices for pointing and bending the blanks are well known in the art, and need not therefore be particularly described. The use of a transverse groove, $a'$ or $a^2$, in connection with the spiral groove $a$ upon each shaft, may, however, be advantageously employed in connection with the bending mechanism for the purpose of arresting the movement of the blank during the operation thereof. The pin-blanks $b\ b$, pointed at one end and bent at the other, (see Fig. 3,) are arrested as they are fed forward in the spiral grooves $a$ of the two shafts by passing into the transverse portions $a'$ $a'$ of the grooves formed immediately in line with an anvil-plate, B, (see Fig. 3,) over which the bent end of the blank is carried and arrested. At the instant the forward movement of one of the blanks $b$ is thus arrested and its bent end rests over the anvil-plate B a retaining-finger, C, (see Figs. 1 and 8,) drops upon the blank just within its bend to hold it fast, while a mandrel, D, is carried simultaneously within the bend (see Figs. 2 and 9) to fill up the space included therein, the thickness of the mandrel being equal to that of the wire. The movements of the retaining-finger C and of the mandrel D are derived from the cam-wheel E upon a shaft, M', mounted in the frame of the machine parallel with the conveying-shafts A A and above the main driving-shaft M. The finger C is formed upon the end of a bar, $c'$, fitted to reciprocate vertically in ways on a bracket or standard, $c^2$, (see Fig. 1,) at one side of the line of movement of the mandrel D. This bar $c'$ is actuated by an arm, $c^3$, upon a rock-shaft, $c^4$, extending back and into line with the cam-wheel E, and whose opposite end is fitted with an arm, $c^5$, at right angles to the arm $c^3$, which terminates with a friction-roller, $c^6$, to bear against a cam-surface, $c^7$, upon the face of the wheel E, as shown in Fig. 1. The cam $c^7$ is so adjusted as that once in each revolution of the wheel E the arm $c^3$ is thrown out from the face of the wheel, thereby producing an oscillation of the shaft $c^4$, and by means of the arm $c^3$ a movement of the bar $c^2$ to carry the finger C down upon the wire. The cam-surface $c^7$ is so proportioned in length as that it will cause the finger C to bear upon the wire blank until a cap (see Fig. 7) has been placed and secured thereon, as hereinafter described, whereupon the arm $c^3$ and shaft $c^4$ are thrown back and the finger C lifted by means of a spring, F. (See dotted lines, Fig. 1.)

To cause the mandrel D to enter the bend of the wire blank in a horizontal direction simultaneously with the vertical descent of the finger C, the mandrel is fitted upon the end of an arm, D', (see Figs. 2 and 9,) pivoted at its upper end upon a pin, $D^2$, (see Figs. 1 and and 10,) projecting from the upper end of a reciprocating punch-bar, G, mounted to play vertically within a tubular bracket, G', immediately over the anvil and in line with the bent end of the wire blank placed over it. The pin $D^2$ projects through a slot in the side of the standard G' and through a block, $D^3$, (see Fig. 10 and dotted lines, Fig. 2,) fitted to play in a direction coincident with the play of the bar G within a rectangular slot in an enlarged head, $D^4$, formed upon the arm, said block being upheld in the upper portion of the slot by means of a spring, $e$, fitted under it within the slot. The arm D', extending horizontally from its slotted and pivoted head, is bent first downward at the side of the bracket for a short distance, and then with a double curve out to the front, as shown in Figs. 1 and 2, so that the mandrel D upon its lower end will, as the arm swings upon its pivot at $D^2$, vibrate in and out under the end of the punch-bar G, and into and out of the bend of the wire blank supported upon the anvil under said punch-bar. This movement of the mandrel upon the arc of a circle having the pivot-pin $D^2$ as its center is produced by means of a pin, H, (see Fig. 2,) upon the side of a horizontal lever, H', pivoted at its front end to the bracket G', and whose rear end is fitted with a friction-roller, $H^2$, running in a cam-groove, $r$, upon the face of a wheel, E', upon the same shaft as the wheel E. At each revolution of the wheel E' the lever H' is thereby carried once up and down. The lever H' intersects the arm D', and its pin H is placed at the point of their intersection, so as to project through a diagonal slot, $d$, in the arm, (see dotted lines, Fig. 2,) whereby the movement of the pin H is made to produce a vibration of the arm D' in a direction at a right angle with that of the lever H', causing its lower end carrying the mandrel D to swing in and out over the anvil. The lower end of the vertical bar G is fitted with a punch, $G^2$, and the upper face of the anvil is formed to present a counterpart die, so that the opposed faces of the punch and die shall operate upon an interposed cap, W, (see Fig. 2,) to close and clamp it upon the bent end of the wire blank $b$, upon which the cap is fitted. The bar G, with its punch $G^2$, is made to descend upon the blank at the proper moment by means of a centrally-pivoted lever, $G^3$, pivoted upon a stud, $G^4$, (see Figs. 2 and 3,) and whose inner arm is fitted with a friction-wheel, $G^5$, made to bear by means of a spring, $e'$, upon the periphery of a cam-wheel, $E^2$, mounted upon the same shaft as the wheel E' by its side, and which is provided with a peripheral cam, $f$, (see Fig. 2,) by which the lever $G^3$ is tilted at a suitable moment in the revolution of the wheel. The outer arm of the lever is pivoted to the upper end of the bar G, so that when the lever is oscillated the bar G will be forced down, its return being effected by the pressure of the spring $e'$ upon the inner arm of said lever.

In the rear of the anvil B a hollow feed-wheel, K, is mounted upon a stud-axle, L, projecting from the frame, and whose axis is in the same horizontal plane as the anvil, and parallel with the main shaft and conveying-shafts A A. Its periphery is made to pass into close proximity to the anvil. (See Fig. 2.) Its rim is of a width exceeding that of the caps, W, (see Fig. 7,) to be fitted upon the pins, and of a depth greater than their length, and it is pierced with a series of transverse radial slots, $g$ $g$, (see Figs. 4 and 5,) in each of which a carrier-plate, $g'$, is fitted to slide freely, the outer end of each plate being notched or recessed to receive and embrace one of the caps W. The inner end of each plate terminates in an arm, $g^2$, (see Figs. 4 and 5,) which passes through an opening in an inner concentric plate, $h$, and is fitted with a transverse pin, $i$, which, when the outer end of the plate $g'$ is flush with the outer periphery of the rim, is borne against said plate $g'$ by means of a coiled spring, $l$, interposed between the pin and the inner face of the rim of the wheel. A suitable bearing is obtained for the wheel upon the stud-axle L by means of a hub, K, on one side thereof. The inner end of the stud-axle is pierced diametrically with a horizontal aperture, through which a rod, $m$, is carried. The inner end of said rod is made to bear against the inner end of the arm $g^2$ of that plate $g'$ which is at the time in the same horizontal plane. Its outer end is bent, as shown in Fig. 5, to pass around the rim of the wheel K, and is extended to reach a cam-wheel, $M^2$, upon the main shaft $M'$ of the machine (see Fig. 2) and engage by means of a friction-roller, $m'$, upon one side thereof a cam-groove upon the face of said wheel $M^2$, (see dotted lines in Fig. 2,) whereby a positive reciprocating movement of the rod is obtained at each revolution of the wheel. This movement is sufficient to cause the rod $m$ to force the outer ends of the radial plates $g^2$, each in turn, out from the rim of the wheel K, over the anvil B, far enough to carry the cap W, fitted in the recess in the end of the plate $g^2$, over the bent end of the one wire blank $b$ which may be in position over and upon the anvil to receive it. The feed-wheel K is rotated intermittently and moved forward at each stroke far enough to bring the radial plates $g^2$ successively into line with the top of the anvil by means of a spring-actuated pawl, N, (see Fig. 2,) upon the side of an oscillating lever, $N'$, projecting from an annular band, $N^2$, encircling the rim of the wheel K, or which may be otherwise pivoted upon the axis of the wheel to vibrate thereon. The outer end of the lever $N'$ is fitted with a friction-roller, $N^3$, to ride upon the periphery of the cam-wheel $M^2$, and is lifted at each revolution of said wheel by means of a cam, $N^4$, thereon. The pawl N is made to engage a ratchet, $p$, encircling the hub $K'$ of the wheel K, (see Figs. 2 and 5,) and whose notches are so proportioned in length as that each movement of the lever $N'$ produced by the cam $N^4$ will first carry the wheel K forward the length of a notch, and then cause the pawl to drop back to engage the next notch. The number of notches corresponds with that of the radial plates $g^2$ in the wheel K, so that each movement of the pawl will carry one of said radial plates out into line with the anvil. A punch, P, actuated by an eccentric on a shaft, $P^2$, whose axis is parallel with that of the main driving-shaft M and of the wheels E E′, is placed vertically over the axis of the feed-wheel. This punch P is made to reciprocate immediately over the periphery of said wheel in a line with its axis, so as to deliver the caps formed thereby each directly into the receptive recess in one of the radial plates $g^2$ of the wheel, one of said plates being carried into line and registry with the punch at each movement of the wheel.

The construction, movement, and operation of the punch and the mode of cutting out the blanks and of feeding them thereto do not differ substantially from those of the ordinary devices commonly employed for making these caps, and, being well known to the art, need not herein be particularly described. The blanks being fed in the customary manner under the punch P, (see Figs. 2 and 11,) are thereby forced into shape in a die placed over the feed-wheel and through the die (see Fig. 12) into the recess in the plate $g'$ awaiting to receive it. So soon as this is accomplished, the punch is lifted and the wheel K moves forward to carry the cap W forward and bring another plate $g'$ in line to receive a cap from the punch.

Instead of connecting the punch P, by which the cap-blanks are formed into caps W, (see Fig. 7,) with the machine, to force each cap as it is formed down into one of the cap-carrying plates of the feed-wheel K, the caps W, Fig. 7, may be formed in a separate machine and supplied to the feed-wheel through a delivery-tube fitted with a spring-actuated escapement-lever, S, (see Fig. 13,) actuated by a pin on the side of the wheel, so as to deliver a cap to the appropriate plate $g^2$ at each movement of the machine. The shafts $M'$ and $P^2$ are geared to the main shaft M by means of cog-wheels T T at one end of the machine, (see Fig. 1, and dotted lines, Fig. 2,) so as to move in unison.

Figure 15:
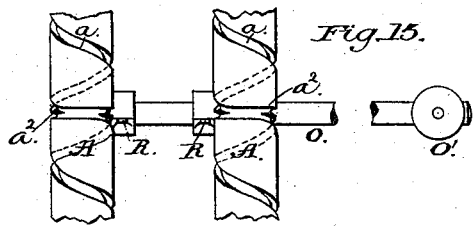

For the purpose of starting the pin-blanks forward after a cap has been fitted thereon, in case that portion $a^2$ of the feed-grooves upon the carrier-screws which is formed at a right angle to the axis of the screw is made to include its entire circumference, as shown in Figs. 14 and 15, I mount a rock-shaft, O, under the transverse grooves $a^2$ $a^2$ at a right angle to the screw-shafts A A and fit thereon the fingers R R, (see Fig. 14,) to project therefrom up under the blank resting in the grooves, so as to lift the same out of the grooves and throw it slightly forward beyond them into the spiral portion $a$ of the grooves at each oscillation of the shaft O. This oscillation of the shaft is produced at the moment each blank is capped and set free by means of an arm, $O'$, on the end of the shaft O, brought to bear against the face of the wheel E, so as to be actuated by a cam projection thereon. (Not shown in the drawings.)

In the operation of my improved capping-machine the wire pin-blanks $b\ b$, after being pointed at one end and bent at the other in the usual manner, and fed forward by the rotation of the spirally-grooved shafts A A, as in the machines now in use, are each arrested in turn upon reaching the anvil B by reason of the change in direction of the spiral grooves on the shafts from a direction oblique to the axis of the shaft to one at right angles thereto, as shown at $a'$ in Figs. 3 and 6 of the drawings. At the instant the movement of the wire blank $b$ is thus arrested with its bent end resting over the anvil B the retaining-finger C drops upon the blank at a point over the outer edge of the anvil, and thereby secures and steadies it. The anvil is so far recessed at this point, however, as shown in Fig. 8, as that the pressure upon the wire will cause its inner bent end to spring up slightly from the face of the anvil, so as to facilitate the insertion of a cap W upon said end. Simultaneously the mandrel D commences to move in alongside of the wire, and is carried into its bend, and the radial plate $g'$ in the wheel K, which is in line with the anvil, is pushed outward by means of an engagement of the inner end of the rod $m$ with the cam-groove $m'$, (see Fig. 4,) so as to carry the cap W, held in the end of the plate, over and upon the bent end of the wire $b$, and supported by the mandrel D inserted therein. So soon as the cap W has thus been fitted upon the wire $b$, the punch $G^2$ descends upon the cap and bends and clamps its edges firmly upon the wire to clamp and embrace it closely, the interior of the cap within the bend being kept open by means of the mandrel. The instant the cap is thus secured to the wire the mandrel D is withdrawn from the wire and swings up out of the way, the radial carrying-plate $g'$ in the wheel moves back, the finger C is next lifted, and finally the punch $G^2$ rises and leaves the capped pin-blank wholly free. The cap-carrying wheel K in the meantime rotates far enough to carry the empty plate $g'$ forward and bring another cap into line with the anvil, the cap-forming punch P having formed from a blank and deposited into the top of the wheel another cap W during the movement of the punch $G^2$. By this time in the revolution of the spirally-grooved shafts A A the end of the transverse portion $a'$ of the groove has reached the capped pin, so that the wire becomes once more engaged by the spiral portion $a$ of the groove and is moved thereby and carried forward to the coiling-machine; or, if the screw-shafts A A be provided with circumferential grooves $a^2$ $a^2$, the fingers R R are brought into play to lift the capped wire forward. (See Fig. 14.) At the moment the capped blank commences its forward movement another blank enters the transverse portion $a'$ or $a^2$ of each groove on the shafts, and, being arrested in position, as above described, over the anvil B, is in turn automatically capped by the movements set forth.

I am aware that a feeding-screw having a variable pitch and with the spiral groove therein made to assume for somewhat less than half a turn a direction at right angles to its axis has been heretofore employed in a nail-machine, and I do not therefore claim as new the conveying-shafts in my machine formed each with a spiral thread which is diverted for a short distance at a right angle to its length; but

I claim as my invention—

1. A spirally-grooved rotating conveying-shaft, A, formed with a transverse circumferential detaining-groove, G, completely encircling the same to arrest and detain a blank fed forward by means of the spiral conveying-groove, in combination with a lifting device, substantially as described, for lifting and forwarding the blanks from said detaining-groove to the conveying-groove, substantially in the manner and for the purpose herein set forth.

2. The combination, in a safety-pin machine, of two spirally-grooved rotating conveying-shafts having a corresponding portion of the length of the groove in each diverted at a right angle to the length of the shafts, an anvil placed opposite the transverse portion of said grooves, a reciprocating retaining-finger adapted, as described, to drop upon a wire pin-blank brought over the anvil by the conveying-shafts at the moment said blank enters the transverse length of the grooves in said shafts, an intermittently-rotating wheel whose axis is at a right angle to the conveying-shafts and in the same horizontal plane as the top of the anvil, and whose periphery is in close proximity to the latter, a series of cap-carrying plates fitted to move radially in openings in the periphery of said wheel, a horizontal reciprocating rod moving substantially as described, and operating to force out each radial plate when it is brought to rest opposite the anvil, a spring to retract each plate when the pressure of the rod is removed, a feeding device whereby caps are supplied, in manner as set forth, to the cap-carrying plates in the wheel, a reciprocating punch mounted over the anvil to descend upon the cap upon the end of the wire blank and close and clamp the same thereon, and mechanism, substantially as described, for actuating in succession and intermittently the retaining-finger, feed-wheel, reciprocating rod, and punch, all substantially in the manner and for the purpose herein set forth.

3. The combination, in a safety-pin machine, with its spirally-grooved conveying-shafts A A, having a corresponding portion, $a'$, of the length of the groove in each diverted at a right angle to the length of the shafts, an anvil, B, opposite said grooves, a retaining-finger, C, reciprocating intermittently to and from the outer edge of the anvil in line with the transverse grooves $a'$ $a'$, a feed-wheel, K, rotating intermittently at a right angle to the length of the shafts A A upon an axis in line with the face of the anvil and in a vertical plane passing through the transverse grooves $a'$ $a'$, radial cap-carrying plates $g$, moving in and out of openings in the rim of the wheel K, having recesses in their outer ends adapted to hold caps W, made to fit upon the end of the safety-pin, a feeding device, P, for forming and delivering the caps W W successively to the plates $g$, a reciprocating punch, G, mounted over the anvil in line with the transverse grooves $a'$ $a'$ in the conveying-shafts and with the radial cap-carrying plates in the feed-wheel, a reciprocating bar, G', actuated substantially as described, carrying said punch, a mandrel, D, adapted, as set forth, to swing within the bent end of a wire safety-pin blank brought to rest under the punch G over the anvil, an arm, D', carrying said mandrel and pivoted to the punch-bar G, and a pin projecting into an oblique slot in said arm from a pivoted lever, H', made to oscillate, in manner as described, at right angles to the length of the arm, whereby the bent end of the wire and the cap W fitted thereon receive support at the moment the punch G, carried by the bar G', descends to close and clamp the cap upon the wire, all substantially in the manner and for the purpose herein set forth.

4. The combination, in a capping-machine for safety-pins, of an anvil, B, punch G, a series of radial cap-carrying plates mounted in the rim of an intermittently-rotating feed-wheel, K, a reciprocating rod, M, for forcing out the radial cap-carrying plates over the anvil at each stop of the wheel K, a feeding device, substantially as described, for supplying the caps to the cap-carrying plates, and mechanism, substantially as described, for moving successively the feed-wheel K, the reciprocating rod M, the punch G, and the feeding device, all substantially in the manner and for the purpose herein set forth.

In testimony whereof I have signed my name to this specification in the presence of two subscribing witnesses.

JOEL JENKINS.

Witnesses:
   JOHN A. ELLIS,
   A. B. MOORE.